W. MAUTNER.
TIRE PROTECTOR.
APPLICATION FILED JUNE 15, 1917.

1,259,425.

Patented Mar. 12, 1918.

INVENTOR.
William Mautner
BY Mock & Blum
his ATTORNEYS.

UNITED STATES PATENT OFFICE.

WILLIAM MAUTNER, OF NEW YORK, N. Y.

TIRE-PROTECTOR.

1,259,425.   Specification of Letters Patent.   Patented Mar. 12, 1918.

Application filed June 15, 1917. Serial No. 174,826.

*To all whom it may concern:*

Be it known that I, WILLIAM MAUTNER, a citizen of the United States, residing at borough of the Bronx, in the county of New York and State of New York, have invented certain new and useful Improvements in Tire-Protectors, of which the following is a specification.

My invention relates to that class of devices whose function is to protect pneumatic tires from cuts or other injuries which may be suffered upon the road, and which cause the blow-out of the tire.

One of the objects of my invention is to provide a simple and cheap tire protector which shall guard the tread of the tire, as well as its sides, from all direct contact with the road or with other objects, such as the curb or sidewalk, or the like.

Another object of my invention is to maintain the natural resiliency of the pneumatic tire while guarding it from cuts or punctures.

Another object of my invention is to provide the pneumatic tire with a relatively rigid protector which shall be of greater diameter than the tire, when it is fully inflated, so that there can be a certain amount of relative movement possible between the tire and its protector when a stone or the like is struck.

Other objects of my invention shall appear in the following description and drawings which illustrate a preferred embodiment of my invention.

Figure 1:
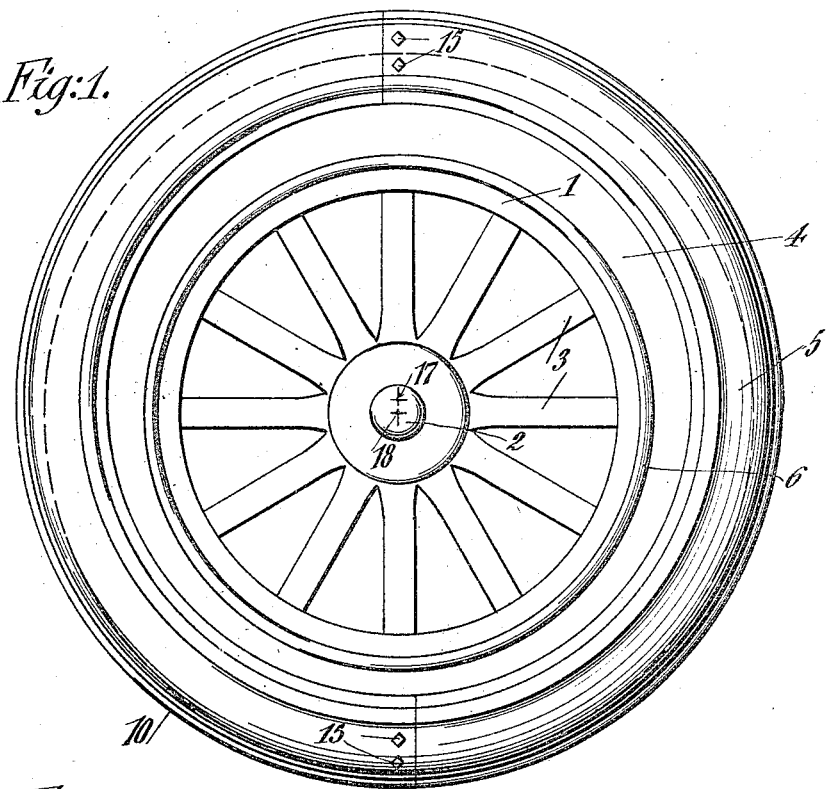
Figure 1 shows a side view of a wheel embodying my invention.
Figure 3:
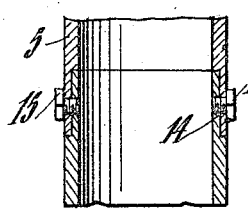
Fig. 3 is a detail view showing fastening means for the two halves of the protector.

The wheel 1 has a hub 2 and spokes 3 and has a felly, being constructed in the ordinary and well-known manner, which in itself forms no part of my invention.

The wheel 1 is provided with a rim 6 for receiving the tire.

In this embodiment here shown the rim 6 is of the clencher type, but, of course, if desired, any well-known form of rim, suitable for holding the tire, may be used.

Upon this rim 6 a pneumatic tire having an inner tube 8 and a shoe 4, may be mounted by means of the ordinary and well-known beads 7 all as is well-known in the art.

The protector 5 is of greater internal diameter at its tread portion than the tread portion of the shoe. It is preferably formed in two semi-circular halves whose ends are chamfered so that they can be fitted together without creating any projecting portions.

These chamfered portions are provided with holes 14 which register when the said halves of the tire protector are fitted together so that threaded bolts 15 may be inserted in these holes 14 which are also threaded to receive them. Any other suitable means of tightly fastening together the two halves of the protector may be used.

Figure 2:
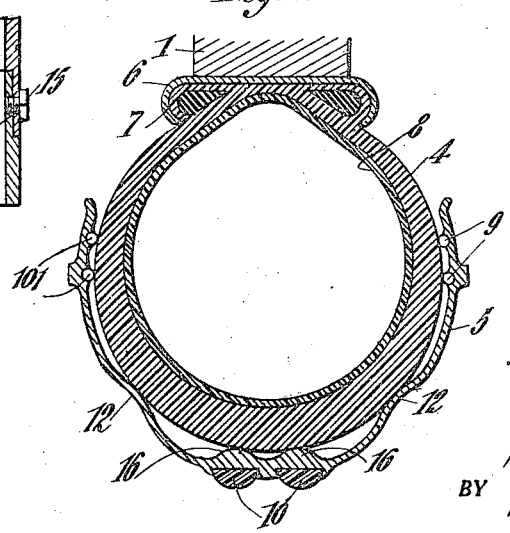
Fig. 2 shows a transverse section along the lower vertical radius of Fig. 1.

The protector, besides having a tread portion, also has inwardly extending lateral portions, which extend over a large portion of the lateral faces of the shoe as shown in Fig. 2.

The lateral faces of the protector preferably extend over about one-half of the lateral faces of the shoe, and protect it from the curb of a sidewalk or the like.

The lateral portions of the protector and its tread are preferably joined by a curved resilient portion 12, so that there is a certain amount of spring or give between the lateral faces and the tread portion of the protector. If necessary, the lateral faces and the tread portion can be made of different metals or alloys, suitably fastened together by screws, bolts or rivets, or any other well-known means which are not shown in the drawings and form no part of my invention in themselves, the important feature of this portion of my construction being that the tread portion of the protector should preferably be of a resilient material. The protector is not connected to the wheel, save at the tire, and hence it can move laterally with respect to the wheel, when the obstacles met on the road tend to distort the tire laterally.

The tread portion of the protector is provided at its exterior with one or more rubber tires 10, which may be of any suitable construction.

The inner portion of the protector is provided with one or more ribs 16 so that any motion of the protector relative to the wheel produces little or no shock upon the wheel.

The interior of the protector is provided with anti-friction bearings 9 and 101 here shown as ball-bearings and which may be inserted throughout the entire protector, save the tread portion thereof, to prevent any abrasion of the shoe by motion relative to the protector.

The operation of my device is as follows:—

After the tire is placed upon the wheel in the ordinary manner, the protector is placed upon the tire. This may be done by jacking up the wheel and then putting the protector into position or by placing one-half of the protector upon the top of the wheel and then bringing it to the bottom, by rotating the wheel once and then putting the other half of the protector into position and fastening it by means of the bolts 15. When the load is applied, the center of the tire is a little below the center of the protector.

When the motor of the vehicle is started the wheel 1 revolves immediately and as it moves forward, together with the tire, upon the protector 5, it causes the rotation of the protector, both by the action of the centrifugal force and the weight of the vehicle.

The tread of the protector is made so resilient, as for instance by the use of the supplemental exterior tires 10, that there is a large area of contact between the tread of the protector and the ground, so that the slight shifting of the wheel with respect to the protector, caused by the rotation of the wheel by the motor, whereby the center of the wheel no longer remains above the lowermost point of the protector, does not cause any slipping or skidding of the protector upon the ground.

The excess of the length of the diameter of the protector, over the diameter of the shoe, and hence the difference of curvatures between the protector and the shoe, depends upon the area of contact between the protector and the ground. In other words, it is desirable that the chord of contact between the protector and the ground should be so long that the wheel should not move beyond it, when the automobile it traveling along a fairly hard level road.

Of course, in horse drawn vehicles this problem does not enter but the main utility of my device would be for use on self propelled vehicles in which the driving wheels must not be allowed to slip.

When an obstacle, such as a small stone or the like, is encountered, since there is a certain freedom of movement between the protector and the shoe and since the protector has been formed with the ribs 16, the shock will be taken up by the pneumatic tire just as though the protector were not present, and the resiliency of the tire will not be substantially affected. The lateral movement of the protector with respect to the shoe is prevented by the substantial lateral flanges of the protector into which the shoe fits, friction being avoided therein by the ball-bearings, between which the lateral faces of the tire tightly fit, without contacting with the inner sides of the flanges of the protector. Hence the fit between the inflated tires and protector is loose, save at the tread portion of the tire and at its points of contact with the anti-friction bearings. Hence, while the tire is always maintained in correct position with respect to the protector, it moves relatively thereto, when the vehicle is in motion, without any distortion thereof save the usual flattening at the tread portion. The torque of the driving wheels does not cause the rotation of the protectors, so that, as before set forth, the wheels can move with respect to the protectors until the latter are rotated by the centrifugal force generated by the motion of the tires upon their protectors, and also by the weight of the vehicle.

While I have described a preferred embodiment of my invention, it is clear that certain parts thereof might be omitted and that modifications can be made in its details, without departing from its spirit, as defined in the following claims:—

1. In combination, a wheel having a tire and a protector for said tire, said protector being of greater width than said tire and having a resilient peripheral tread portion and lateral flanges spaced from said tire, anti-friction members between the lateral portions of said tire and the said lateral flanges, the said tread of the protector being so resilient and the difference between the internal diameter of the protector and the external diameter of the tire being so great, that when said wheel is rotated, it moves forward freely on said protector so that said anti-friction members are operated, and said wheel does not move beyond the chord of contact between said protector and the ground.

2. In combination, a wheel having a tire, and a protector for said tire of greater internal width than said tire and having a tread of greater internal diameter than the external diameter of said tire, said protector having substantial lateral portions provided with anti-friction members between which said tire snugly fits without contacting said lateral flanges, the said protector being laterally movable with respect to said wheel and having its resilient tread portion and said lateral portions joined by intermediate inwardly curved resilient portions which contact with the said tire at the peaks of said curves only, the said protector and tire being so resilient, and the difference between the external diameter of said tire and the internal diameter of said protector being so great that when said wheel is rotated, it moves freely on said protector so that said anti-friction members are operated, without passing beyond the chord of contact between the protector and the ground.

In testimony whereof I hereunto affix my signature.

WILLIAM MAUTNER.